US008949123B2

(12) United States Patent
Garg et al.

(10) Patent No.: US 8,949,123 B2
(45) Date of Patent: Feb. 3, 2015

(54) DISPLAY APPARATUS AND VOICE CONVERSION METHOD THEREOF

(75) Inventors: Aditi Garg, Uttar Pradesh (IN); Kasthuri Jayachand Yadlapalli, Andhra Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 13/444,190

(22) Filed: Apr. 11, 2012

(65) Prior Publication Data

US 2012/0259630 A1 Oct. 11, 2012

(30) Foreign Application Priority Data

Apr. 11, 2011 (IN) ........................... 1248/CHE/2011
Nov. 7, 2011 (KR) ........................ 10-2011-0115201

(51) Int. Cl.
*G10L 15/20* (2006.01)
*G10L 13/033* (2013.01)
*G10L 21/013* (2013.01)

(52) U.S. Cl.
CPC ....... *G10L 13/033* (2013.01); *G10L 2021/0135* (2013.01)
USPC ........... 704/233; 704/258; 704/269; 704/264; 704/271; 704/278

(58) Field of Classification Search
CPC ....... G10L 13/00; G10L 13/033; G10L 13/08; G10L 13/086
USPC .................. 704/233, 258, 269, 264, 271, 278
See application file for complete search history.

(56) References Cited

U.S. PATENT DOCUMENTS

| | | | | |
|---|---|---|---|---|
| 6,778,252 | B2 * | 8/2004 | Moulton et al. | 352/12 |
| 7,023,454 | B1 * | 4/2006 | Knight | 345/646 |
| 7,598,975 | B2 | 10/2009 | Cutler | |
| 2003/0117485 | A1 * | 6/2003 | Mochizuki et al. | 348/14.01 |
| 2003/0123712 | A1 * | 7/2003 | Dimitrova et al. | 382/118 |
| 2003/0228135 | A1 | 12/2003 | Illsley | |
| 2005/0042591 | A1 | 2/2005 | Bloom et al. | |
| 2005/0228673 | A1 | 10/2005 | Nefian et al. | |
| 2006/0204060 | A1 * | 9/2006 | Huang et al. | 382/118 |
| 2008/0052069 | A1 * | 2/2008 | Flanagan et al. | 704/235 |
| 2008/0152197 | A1 | 6/2008 | Kawada | |
| 2008/0235024 | A1 * | 9/2008 | Goldberg et al. | 704/260 |
| 2008/0279425 | A1 | 11/2008 | Tang | |
| 2009/0135177 | A1 | 5/2009 | Strietzel et al. | |

* cited by examiner

*Primary Examiner* — Qi Han
(74) *Attorney, Agent, or Firm* — Sughrue Mion, PLLC

(57) ABSTRACT

The voice conversion method of a display apparatus includes: in response to the receipt of a first video frame, detecting one or more entities from the first video frame; in response to the selection of one of the detected entities, storing the selected entity; in response to the selection of one of a plurality of previously-stored voice samples, storing the selected voice sample in connection with the selected entity; and in response to the receipt of a second video frame including the selected entity, changing a voice of the selected entity based on the selected voice sample and outputting the changed voice.

20 Claims, 8 Drawing Sheets

DISPLAY APPARATUS AND VOICE CONVERSION METHOD THEREOF

CROSS-REFERENCE TO RELATED APPLICATIONS

This application claims priority from Indian Patent Application No. 1248/CHE/2011, filed on Apr. 11, 2011 in the Indian Patent Office, and Korean Patent Application No. 10-2011-0115201, filed on Nov. 7, 2011, in the Korean Intellectual Property Office, the disclosures of which are incorporated herein by reference in their entireties.

BACKGROUND

1. Field

Apparatuses and methods consistent with exemplary embodiments relate to a display apparatus using a voice changing method, and more particularly, to customizing audio data of content and converting a voice in the display apparatus providing content.

2. Description of the Related Art

Internet Protocol TeleVision (IPTV) provides multimedia services, such as audio and video data services, via IP networks. The multimedia services may include live TeleVision (TV), Video-On-Demand (VOD), time-shifted programming services, etc. The faces of so-called entities included in a video clip may be replaced with other faces. The term “entity” generally indicates the face of a particular character or a person selected from a video clip by a user. Various face recognition methods may be used to replace a face of one entity selected from a video clip with a face of another entity. However, there has been no method for changing a voice of the selected entity voice into another voice that a user prefers.

Therefore, there is a need for systems and methods to effectively customize the voice of an entity.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

The exemplary embodiments provide a display apparatus to customize the voice of an entity selected from an input video frame by a user and a voice conversion method used in the display apparatus.

According to an aspect of an exemplary embodiment, there is provided a voice conversion method of a display apparatus, the voice conversion method including: in response to the receipt of a first video frame, detecting one or more entities from the first video frame; in response to the selection of one of the detected entities, storing the selected entity; in response to the selection of one of a plurality of previously-stored voice samples, storing the selected voice sample in connection with the selected entity; and in response to the receipt of a second video frame including the selected entity, changing a voice of the selected entity based on the selected voice sample and outputting the changed voice.

The detected entities may include the faces of characters included in the first video frame and the detecting may include detecting the faces of the characters from the first video frame based on at least one of entity skin tone, entity motion, entity size, entity shape, and entity location by using a face detection module.

The voice conversion method may also include, in response to the detection of one or more entities from the first video frame, displaying the detected entities on one side of a display screen as a list.

The voice conversion method may also include, in response to the selection of one of the detected entities, displaying the previously-stored voice samples on one side of a display screen as a list.

The storing the selected entity may include storing a first identifier (ID) corresponding to the selected entity in a lookup table, and the storing the selected voice sample includes storing a second ID corresponding to the selected voice sample in the lookup table.

The previously-stored voice samples may include at least one of voice samples embedded in advance in the display apparatus, recorded voice samples, and user-inputted voice samples, wherein the recorded voice samples and the user-inputted voice samples are filtered by a voice sub-sampler module.

The outputting may include determining whether the second video frame includes the selected entity.

The outputting may include: determining whether there is a lip movement in the selected entity in the second video frame; and in response to the detection of a lip movement from the selected entity in the second video frame, replacing the voice of the selected entity with the selected voice sample.

According to another aspect of an exemplary embodiment, there is provided a display apparatus, including: a detection unit which, in response to the receipt of a first video frame, detects one or more entities from the first video frame; a User Interface (UI) unit which receives a selection regarding a target entity to be subject to voice conversion and a selection regarding a voice sample to be applied to the target entity; a storage unit which stores an entity selected from among the detected entities via the UI unit and a voice sample selected via the UI unit; and a control unit which, in response to the receipt of a second video frame including the selected entity, changes a voice of the selected entity based on the selected voice sample and outputs the changed voice.

The detected entities may include the faces of characters included in the first video frame, and the detection unit may detect the faces of the characters from the first video frame based on at least one of entity skin tone, entity motion, entity size, entity shape, and entity location by using a face detection module.

The display apparatus may also include: a video processing unit which processes the first video frame or the second video frame; an audio processing unit which processes an audio signal corresponding to the first video frame or the second video frame; a display unit which displays the video frame processed by the video processing unit; and an audio output unit which outputs the audio signal processed by the audio processing unit in synchronization with the video frame processed by the video processing unit, wherein the control unit controls the audio processing unit to change the voice of the selected entity based on the selected voice sample and provide the changed voice to the audio output unit.

The control unit may control the display unit to, in response to the detection of one or more entities from the first video frame, display the detected entities on one side of a display screen as a list.

The control unit may control the display unit to, in response to the selection of one of the detected entities, display a plurality of voice samples on one side of a display screen as a list.

The storage unit may store a first ID corresponding to the selected entity and a second ID corresponding to the selected voice sample in a lookup table.

The storage unit may store at least one of voice samples embedded in advance in the display apparatus, recorded voice samples, and user-inputted voice samples.

The recorded voice samples and the user-inputted voice samples may be filtered by a voice sub-sampler module.

The control unit may determine whether the second video frame includes the selected entity by using a face search sub-module.

The control unit may determine whether there is a lip movement in the selected entity in the second video frame and, in response to the detection of a lip movement from the selected entity in the second video frame, may replace the voice of the selected entity with the selected voice sample.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
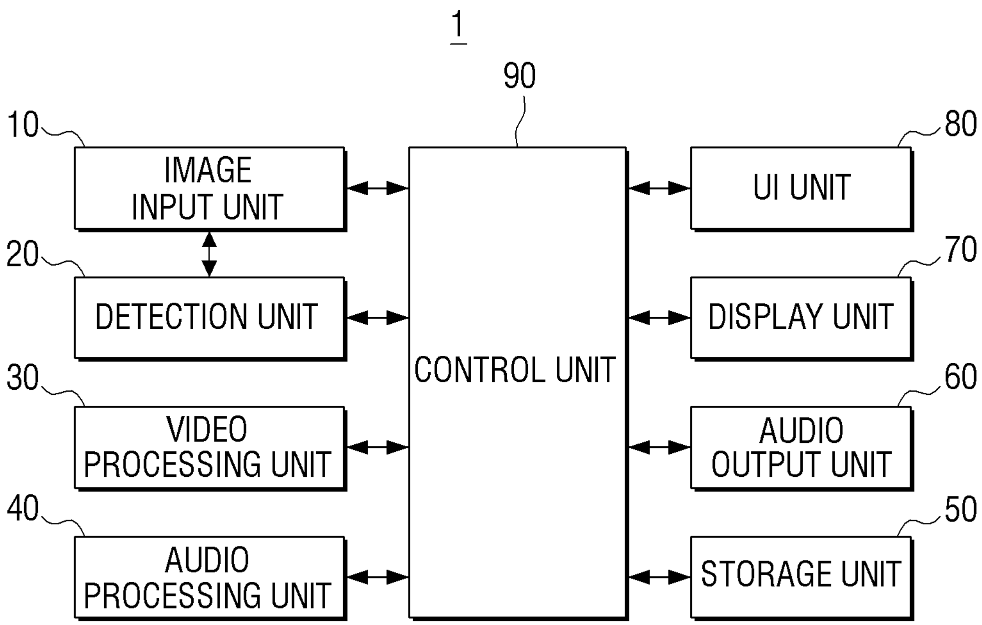
FIG. 1 is a block diagram illustrating a display apparatus according to an exemplary embodiment.

Certain exemplary embodiments are described in detail below with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. However, exemplary embodiments can be carried out without those specifically defined matters. Also, well-known functions or constructions are not described in detail since they would obscure the exemplary embodiments with unnecessary detail.

FIG. 1 is a block diagram illustrating a display apparatus according to an exemplary embodiment.

Referring to FIG. 1, a display apparatus 1 includes an image input unit 10, a detection unit 20, a video processing unit 30, an audio processing unit 40, a storage unit 50, an audio output unit 60, a display unit 70, a UI unit 80, and a control unit 90.

The image input unit 10 may receive image data, including an input video frame, from an external source (not illustrated), which is connected to the image input unit 10 wirelessly or by wires/cables. For example, the image input unit 10 may receive broadcast data from a broadcasting station or may receive video data from an image input apparatus, such as a Digital Versatile Disc (DVD) player.

The detection unit 20 may detect an entity from the input video frame. The term "entity" may indicate, but is not limited to, the face image of a character included in the input video frame. The detection unit 20 may detect an entity from the input video frame by using a face detection module (not illustrated). The detection unit 20 may detect an entity from the input video frame based on a plurality of entity properties such as at least one of skin tone, motion, size, shape, and location.

The video processing unit 30 may process the input video frame. That is, the video processing unit 30 may perform video processing, such as decoding, scaling, etc., on the received image data.

The audio processing unit 40 may process an audio signal corresponding to the input video frame. More specifically, the audio processing unit 40 may perform audio processing under the control of the control unit 90 such that the voice of an entity included in the input video frame can be changed.

The storage unit 50 may store various data for driving the display apparatus 1 and various multimedia data. The storage unit 50 may store various modules to perform voice conversion for the display apparatus 1.

The audio output unit 60 may output the audio signal processed by the audio processing unit 50. For example, the audio output unit 60 may be implemented as a speaker.

The display unit 70 may display the input video frame processed by the video processing unit 30.

The UI unit 80 may receive a control command to control the display apparatus 1 from a user. More specifically, a target entity to be subject to voice conversion and a voice sample to be applied to the target entity may be selected by using the UI unit 80.

For example, the UI unit 80 may be implemented as an input device, such as a Graphic UI (GUI), a touch screen, a remote control, a pointing device, etc.

The control unit 90 may control the display apparatus 1 based on a control command received via the UI unit 80. The control unit 90 may perform voice conversion to customize the voice of an entity included in the input video frame.

More specifically, in response to the receipt of a first video frame via the image input unit 10, the control unit 90 may control the detection unit 20 to detect at least one entity from the first video frame.

In response to the detection of one or more entities from the first video frame, the control unit 90 may control the display unit 80 to display a list of the detected entities on one side of a display screen.

In response to the selection of one of the detected entities (for example, a first entity) from the displayed list, the control unit 90 may control the storage unit 50 to store the first entity. For example, the control unit 90 may control the storage unit 50 to store the first entity along with a first identifier (ID), which is the ID of the first entity.

To select a voice sample to be applied to the first entity, the control unit 90 may control the display unit 80 to display a list of a plurality of voice samples on one side of the display screen. The plurality of voice samples may include at least one of voice samples stored in advance, recorded voice samples, and user-inputted voice samples.

In response to the selection of one of the plurality of voice samples via the UI unit 80, the control unit 90 may control the storage unit 50 to store the selected voice sample in association with the first entity. The control unit 90 may control the storage unit 50 to store a second ID, which is the ID of the selected voice sample.

In response to the selection of a second video frame, the control unit 90 may determine whether the second video frame includes the first entity. In response to the detection of the first entity from the second video frame, the control unit 90 may control the audio processing unit 40 to convert the voice of the detected first entity based on the selected voice sample and to output the converted voice of the detected first entity to the audio output unit 60.

The control unit 90 may detect a lip movement from the first entity in the second video frame. In response to the detection of a lip movement from the first entity, the control unit 90 may control the audio processing unit 40 to convert the voice of the first entity based on the selected voice sample and to output the converted voice of the first entity to the audio output unit 40.

The control unit 90 may convert at least one of the tone and pitch of the voice of the first entity.

According to an exemplary embodiment, the display apparatus 1 may provide the user with voice-customized content by converting the voice of the first entity based on the selected voice sample.

A voice conversion method according to an exemplary embodiment is described with reference to FIGS. 2 to 8.

Figure 2:
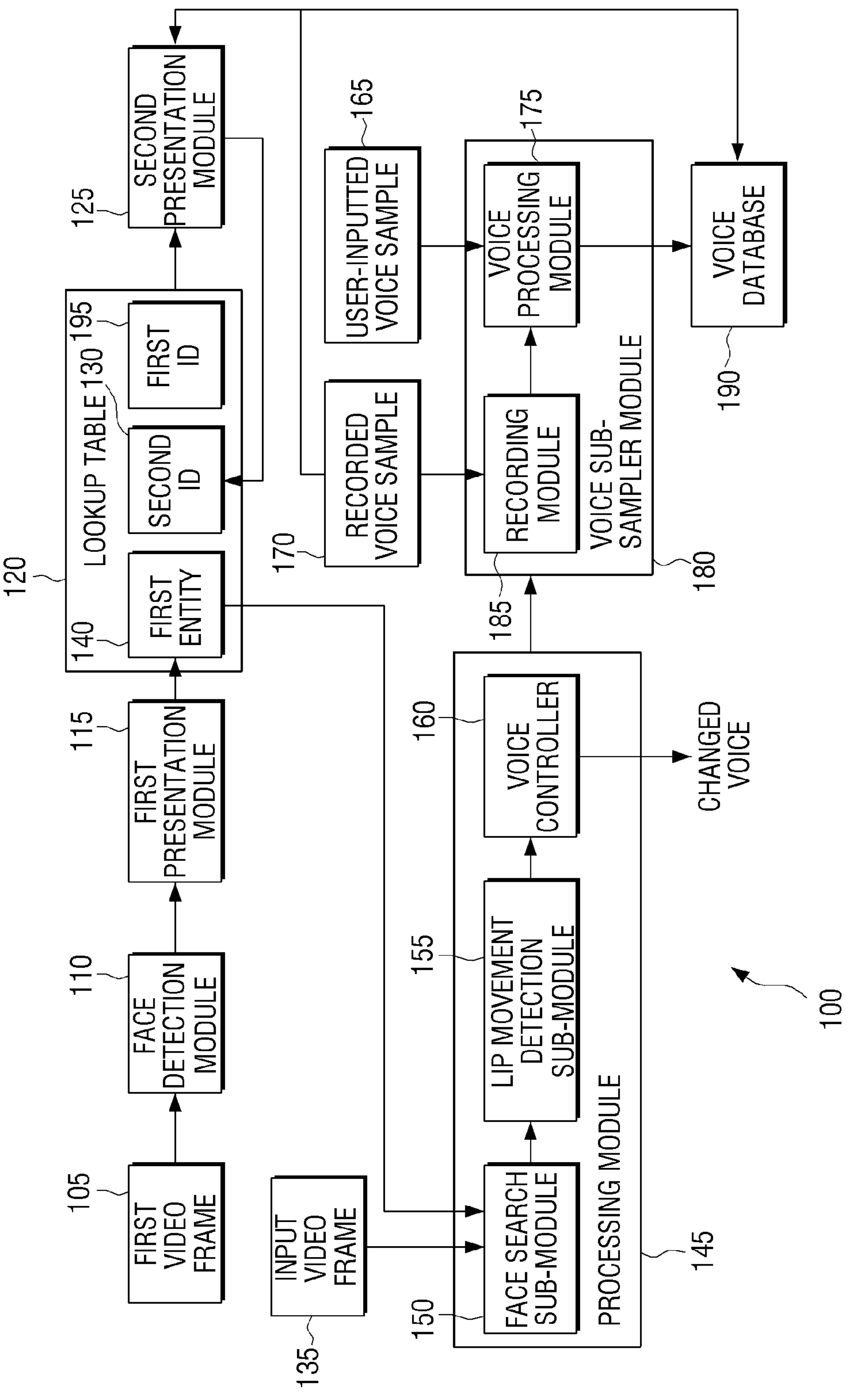
FIG. 2 is a block diagram illustrating an apparatus for customizing the voice of an entity, according to an exemplary embodiment.

FIG. 2 is a block diagram of an apparatus for customizing or converting the voice of an entity, according to an exemplary embodiment.

Referring to FIG. 2, the display apparatus 100 includes, a face detection module 110, a first presentation module 115 for selecting an entity, a lookup table 120, a second presentation module 125 for selecting a voice sample, a second ID 130, a first ID 195, a control unit such as a processing module 145, a voice sub-sampler module 180, and a voice database 190. The processing module 145 includes a face search sub-module 150, a lip movement detection sub-module 155, and a voice controller 160. The voice sub-sampler module 180 includes a voice processing module 175 and a recording module 185.

The first video frame 105 may be displayed by the display apparatus 100. For example, the display apparatus 100 may be implemented as, but is not limited to, a computer, an IPTV, a VOD player, a Consumer Electronics (CE) device, an Internet TV, etc. For example, the first video frame 105 may include, but is not limited to, a movie, a broadcast stream, a live video, a video clip, etc. The display apparatus 100 may receive the first video frame 105 via a network. For example, the network may include, but is not limited to, a wireless network, the Internet, an intranet, Bluetooth, a Small Area Network (SAN), a Metropolitan Area Network (MAN), an Ethernet, etc. The first video frame 105 may include a plurality of entities. The plurality of entities may be interpreted as a plurality of characters that appear in the first video frame 105. To perform voice customization, a user may select one of the plurality of entities, for example, the first entity 140, from the first video frame 105.

To perform voice customization, the user may execute a 'voice settings' option in the display apparatus 100. In accordance with a selection made with the 'voice settings' option, the face detection module 110 may be driven to capture the first video frame 105. The face detection module 110 may extract at least one entity from the first video frame 105. The face detection module 110 may use a plurality of entity properties to detect at least one entity from the first video frame 105. For example, the plurality of entity properties include, but are not limited to, skin tone, motion, size, shape, and/or location. The face detection module 110 may use various algorithms to detect an entity from the first video frame 105.

A list of one or more entities included in the first video frame 105 may be displayed by the first presentation module 115. The user may select an entity, for example, the first entity 140, from the list displayed by the first presentation module 115, and the first entity may be stored in the lookup table 120 in association with the first ID 195 so that the first entity may be identified by the first ID 195. The lookup table 120 may include the second ID 130. The second ID 130 may indicate a voice sample to be used in voice customization for the first entity 140. The voice database 190 may store a plurality of voice samples. The user may select a voice sample from the voice database 190. The second presentation module 125 may display a list of the voice samples present in the voice database 190. The second presentation module 125 may allow the user to select a voice sample from the voice database 190.

The voice sub-sampler module 180 may process the selected voice sample. For example, the selected voice sample may be, but is not limited to, the recorded voice sample 170, an embedded voice sample (not illustrated) provided by a service provider, or a user-inputted voice sample 165. Before storing a voice sample in the voice database 190, the voice sub-sampler module 180 may improve the quality of the voice sample by passing the voice sample through a smooth filter (not illustrated). The voice sub-sampler module 180 may record a voice sample in real time by using the recording module 185.

The user may enter a voice sample to the voice sub-sampler module 180 via the Web. The voice sample recorded by the voice sub-sampler module 180 and the voice sample entered to the voice sub-sampler module 180 may be processed by the voice processing module 175, and the processed voice samples may be input to the voice database 190. When a new voice sample is registered in the voice database 190, a second ID may be generated. A voice sample may be stored in the voice database 190 in association with a second ID and may thus be identified by the second ID. A list of the voice samples present in the voice database 190 may be displayed by the second presentation module 125, and the user may select a voice sample from the list displayed by the second presentation module 125. The second ID of the voice sample selected by the user, i.e., the second ID 130, may be stored in the lookup table 120. The second ID 130 may be used to map the selected voice sample to the first entity 140.

The processing module 145, which includes the face search sub-module 150, the lip movement detection sub-module 155, and the voice controller 160, may be connected to the voice sub-sampler module 180, and may be a core element of the display apparatus 100. The processing module 145 may determine whether the 'voice settings' option is being executed by the display apparatus 100.

In a case in which the 'voice settings' option is being executed, the processing module 145 may receive the input video frame 135. The input video frame 135 may be a video clip that may be used to perform voice customization. The processing module 145 may generate a first query for the lookup table 120. The first query may be used to fetch the first entity 140. The first entity 140, which is identified by the first ID 195, may be input to the face search sub-module 150. The face search sub-module 150 may capture one or more entities from the input video frame 135, and may determine whether there is the first entity 140 among the captured entities. The processing module 145 may use an image processing technique to search for the first entity 140 in the input video frame 135.

In a case in which the first entity 140 is detected in the input video frame 135, the processing module 145 may drive the lip movement detection sub-module 155. The lip movement detection sub-module 155 may analyze the input video frame 135 to detect any lip movement from the found first entity. In response to the detection of a lip movement from the found first entity, the lip movement detection sub-module 155 may generate an interrupt for the voice controller 160.

The voice controller 160 may generate a second query to fetch the second ID 130 corresponding to the first entity from the lookup table 120. The voice controller 160 may generate a third query and transmit the third query to the voice database 190 to fetch a voice sample corresponding to the second ID 130. The voice controller 160 may customize the voice of the first entity 140 by changing the properties of the voice of the first entity 140 such as voice tone and pitch. For example, the voice controller 160 may use a voice morphing method, which is a type of voice conversion method, to customize the voice of the first entity 140.

The lookup table 120 may be used to map an entity and a voice sample. The lookup table 120 may store the first entity 140, the second ID 130, and the first ID 195 over a predetermined period of time. In response to the selection of the first entity 140 via the first presentation module 115, the first entity 140 may be stored in the lookup table 120, and the first ID 195 may be generated in the lookup table 120. In response to the selection of a voice sample via the second presentation module 125, the second ID corresponding to the selected voice sample may be stored in the lookup table 120.

In response to the detection of a lip movement from the first entity 140 in the input video frame 135, the second ID 130 may be extracted from the lookup table 120. The second ID 130 may be used to fetch a voice sample to be applied to the first entity 140 from the voice database 190. The voice controller 160 may extract voice properties such as voice tone and pitch to customize the voice of the first entity 140. The customization of the voice of the first entity 140 may be performed without interfering with the user's watching the display apparatus 100.

Figure 3:
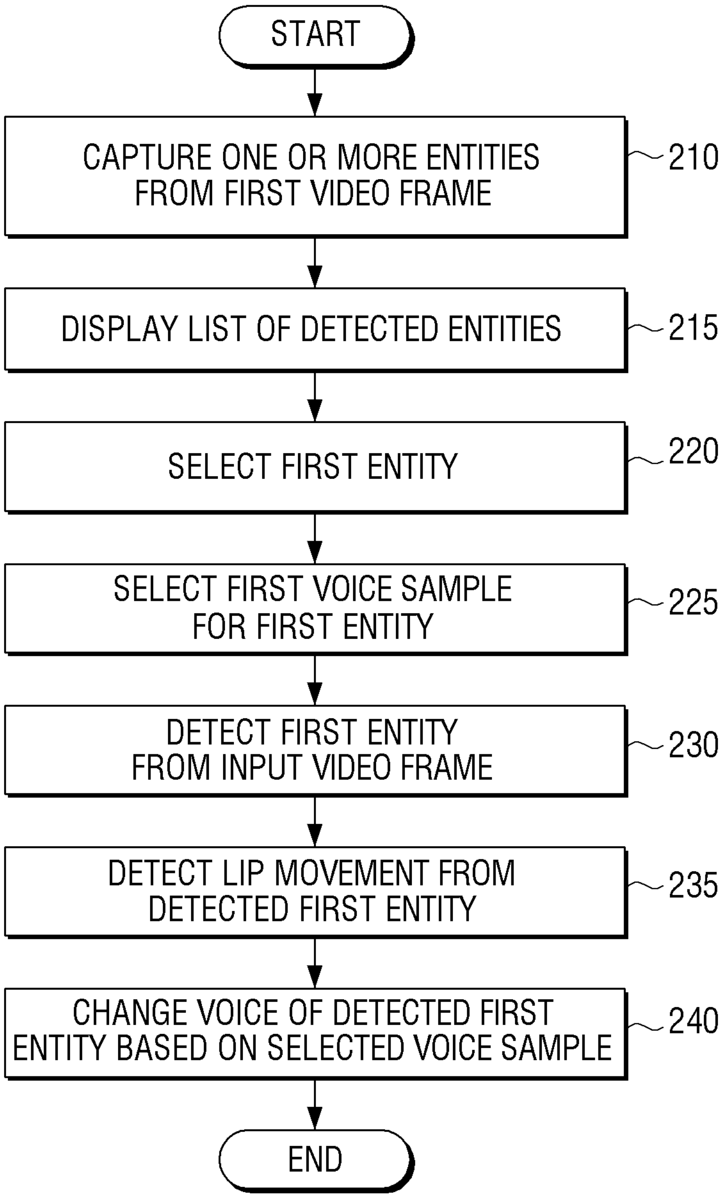
FIG. 3 is a flowchart illustrating a method of customizing the voice of an entity, according to an exemplary embodiment.

FIG. 3 is a flowchart illustrating a method of customizing the voice of an entity selected from the content provided by the display apparatus 100, according to an exemplary embodiment.

Referring to FIG. 3, in operation 210, at least one entity may be captured from a first video frame. The captured entity may be the face of a character included in the first video frame. The first video frame may be, but is not limited to, a video clip or a broadcast video. At least one entity may be captured from the first video frame by a face detection module. The face detection module may use a plurality of entity properties such as skin tone, motion, size, shape, location, etc., to capture at least one entity from the first video frame. The face detection module may also use various algorithms to detect an entity from the first video frame.

In operation 215, a list of entities included in the first video frame may be displayed. The entity list may be displayed by a first presentation module. The first presentation module may generate and display at least one entity included in the first video frame. A user may select an entity from the entity list generated and displayed by the first presentation module, as described in detail below.

In operation 220, the user may select a first entity included in the first video frame. One or more entities included in the first video frame may be included in the entity list generated and displayed by the first presentation module. The user may select the first entity included in the first video frame by using a UI. The UI may be, but is not limited to, a GUI, a touch screen, or a command line interface. For example, the user may use a GUI to enter an input to the first presentation module and to select the first entity included in the first video frame.

In response to the selection of the first entity from the first video frame, the first entity may be stored in a lookup table. The lookup table may be configured to generate and store a first ID by which the first entity may be identified. In a case in which the entity list provided by the first presentation module includes a plurality of entities, a plurality of first IDs respectively corresponding to the plurality of entities may be generated. In this case, at least one of the plurality of entities may be stored in the lookup table. The lookup table may be generated by using a processor.

Alternatively, to store at least one entity included in the first video frame, a hash table may be used.

In operation 225, a first voice sample may be selected. The first voice sample may be stored in a voice database. The voice database may be embedded in a display apparatus, or may be provided in a remote device. The voice database may include a plurality of voice samples. For example, the first voice sample may be represented by a second ID, and the second ID may be stored in the lookup table. A number of second IDs corresponding to the number of voice samples included in the voice database may be generated.

Alternatively, a hash table may be used to store the second ID of the first voice sample.

In operation 230, a determination may be made as to whether there is the first entity in an input video frame. The determination as to the presence of the first entity in the input video frame may be performed by using a face search sub-module. The face search sub-module may compare one or more entities included in the input video frame with the first entity. A digital image processing technique may be used to compare the entities in the input video frame with the first entity. The face search sub-module may match each of the entities included in the input video frame with the first entity to detect the first entity in the input video frame.

A face search sub-module may use various face recognition algorithms to detect the first entity in the input video frame.

In operation 235, a determination may be made as to whether there is any lip movement in the first entity of the input video frame. The determination as to whether there is any lip movement in the first entity of the input video frame may be performed by using a lip movement detection sub-module. The lip movement detection sub-module may use a speech processing technique to detect a lip movement from the first entity of the input video frame.

For example, the lip movement detection sub-module may determine whether there is a need to perform voice conversion and whether there is any lip movement in the first entity of the input video frame. In response to the detection of a lip movement of the first entity of the input video frame, the lip movement detection sub-module may perform a predetermined process to perform voice conversion. Alternatively, if no lip movement is detected from the first entity of the input video frame, the lip movement detection sub-module may bypass the predetermined process to perform voice conversion.

Various algorithms may be applied to the lip movement detection sub-module to detect a lip movement of the first entity of the input video frame.

In operation 240, the voice of the first entity of the input video frame may be converted. The voice of the first entity of the input video frame may be converted by using a voice controller. The conversion of the voice of the first entity of the input video frame may include replacing the voice of the first entity of the input video frame with one of the voice samples in the voice database, as for example, a first voice sample. The voice controller may use various voice synthesization techniques to convert the voice of the first entity of the input video frame based on the first voice sample.

More specifically, the lip movement detection sub-module may drive the voice controller to convert the voice of the first entity of the input video frame based on the first voice sample. For example, the lip movement detection sub-module may generate an interrupt to drive the voice controller. The interrupt may enable the voice controller to convert the voice of the first entity of the input video frame based on the first voice sample. Voice conversion may be applied to the voice of the first entity of the input video frame for a predetermined amount of time. The predetermined amount of time may be the duration of voice conversion.

Figure 4:
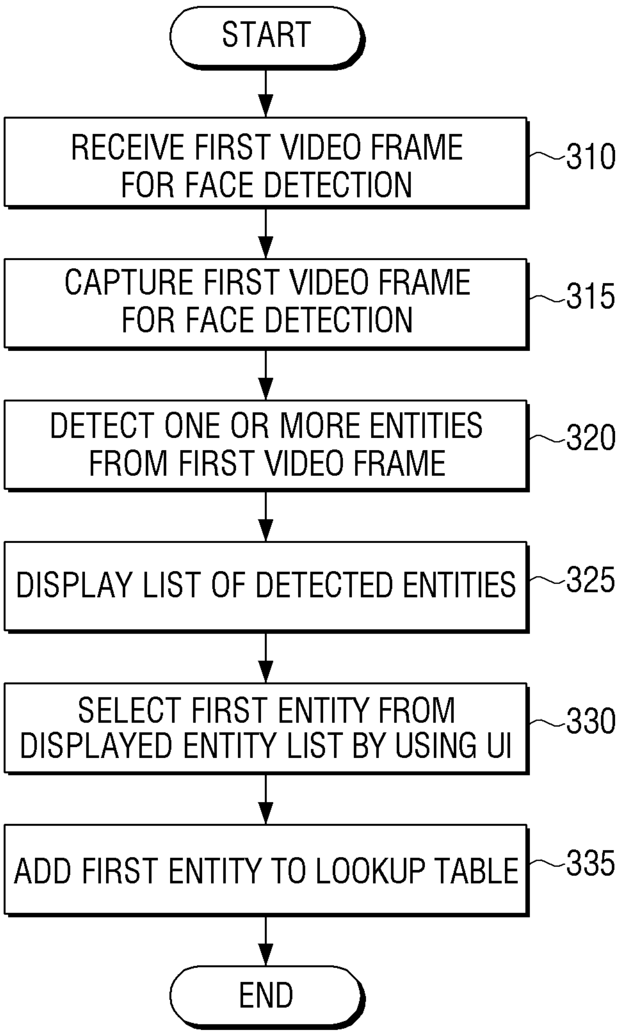
FIG. 4 is a flowchart illustrating a method of selecting and updating an entity, according to an exemplary embodiment.

FIG. 4 is a flowchart illustrating a method of selecting and updating an entity by using a first presentation module, according to an exemplary embodiment.

Referring to FIG. 4, in operation 310, a first video frame may be received as an input for a face detection module. The term "video frame" may include, but is not limited to, at least one of a video, a broadcast stream, a live video, and a video clip. The first video frame may include a plurality of entities. The entities may be the faces of characters included in the first video frame.

In operation 315, the first video frame may be captured by the face detection module. For example, the face detection module may use a digital image processing technique, a chroma key technique, etc., to capture the first video frame.

In operation 320, at least one entity included in the first video frame may be extracted by the face detection module. The extraction of an entity from the first video frame may be performed based on a plurality of entity properties regarding each entity included in the first video frame. For example, the entity properties may include, but are not limited to, at least one of skin tone, motion, size, shape, and location. Various algorithms may be used to capture at least one entity from the first video frame.

In operation 325, a list of one or more entities included in the first video frame may be displayed. The entity list may be displayed by a first presentation module. The first presentation module may display the entities included in the first video frame, and a user may select one of the displayed entities, for example, a first entity, via the first presentation module.

In operation 330, the user may select the first entity from the entities included in the first video frame. The entities included in the first video frame may be displayed as a list by the first presentation module. The user may select the first entity from the entities included in the first video frame by using a UI. The UI may be, but is not limited to, a GUI, a touch screen, or a command line interface.

In operation 335, in response to the selection of the first entity from the first video frame, the first entity may be stored in a lookup table. The lookup table may be configured to generate and store a first ID by which the first entity may be identified. In a case in which the entity list provided by the first presentation module includes a plurality of entities, a plurality of first IDs respectively corresponding to the plurality of entities may be generated. At least one of the plurality of entities may be stored in the lookup table.

Figure 5A:
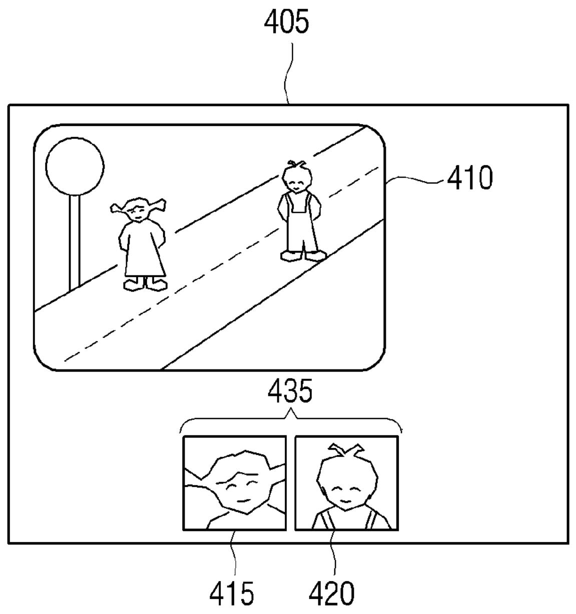
FIGS. 5A and 5B illustrate a UI and a lookup table for selecting an entity, according to an exemplary embodiment.
Figure 5B:
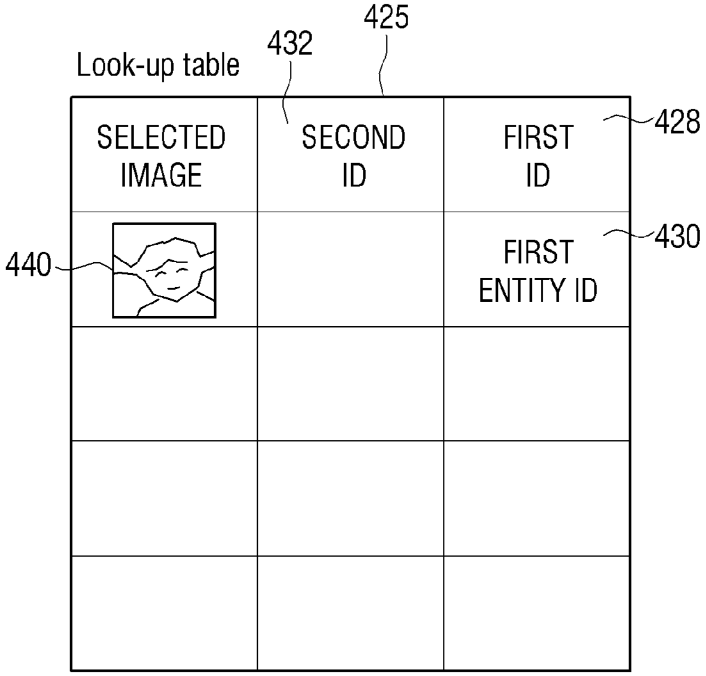

FIG. 5 is a diagram illustrating a UI including a lookup table for selecting an entity, according to an exemplary embodiment. More specifically, FIG. 5A illustrates a display unit 405, and a video frame 410 having a first entity 415 and a second entity 420. FIG. 5B illustrates a lookup table 425 storing a first ID 428 by which the entities are identified and a second ID 435 which identifies voice samples for corresponding entities.

More specifically, the display unit 405 may display the entities included in the video frame 410. For example, the display unit 405 may be, but is not limited to, a computer, an IPTV, a VOD player, an Internet TV, etc. The entities included in the video frame 410 may be detected by a face detection module 110, and the detected entities may be displayed as a list 435 by a first presentation module 115. For example, the entity list displayed by the first presentation module may include the first entity 415 and the second entity 420. A user may select the first entity 415 or the second entity 420 from the entity list displayed by the first presentation module. In response to the selection of the first entity 415, the first ID 430 by which the first entity 415 may be identified may be generated in the lookup table 425. Another first ID may be generated in the lookup table 425 to represent the second entity 420. In a case in which the entity list displayed by the first presentation module includes a plurality of entities, a plurality of first IDs respectively corresponding to the plurality of entities may be generated in the lookup table 425. At least one of the plurality of entities such as an image 440 corresponding to the selected first entity 415 may be stored in the lookup table 425.

Figure 6:
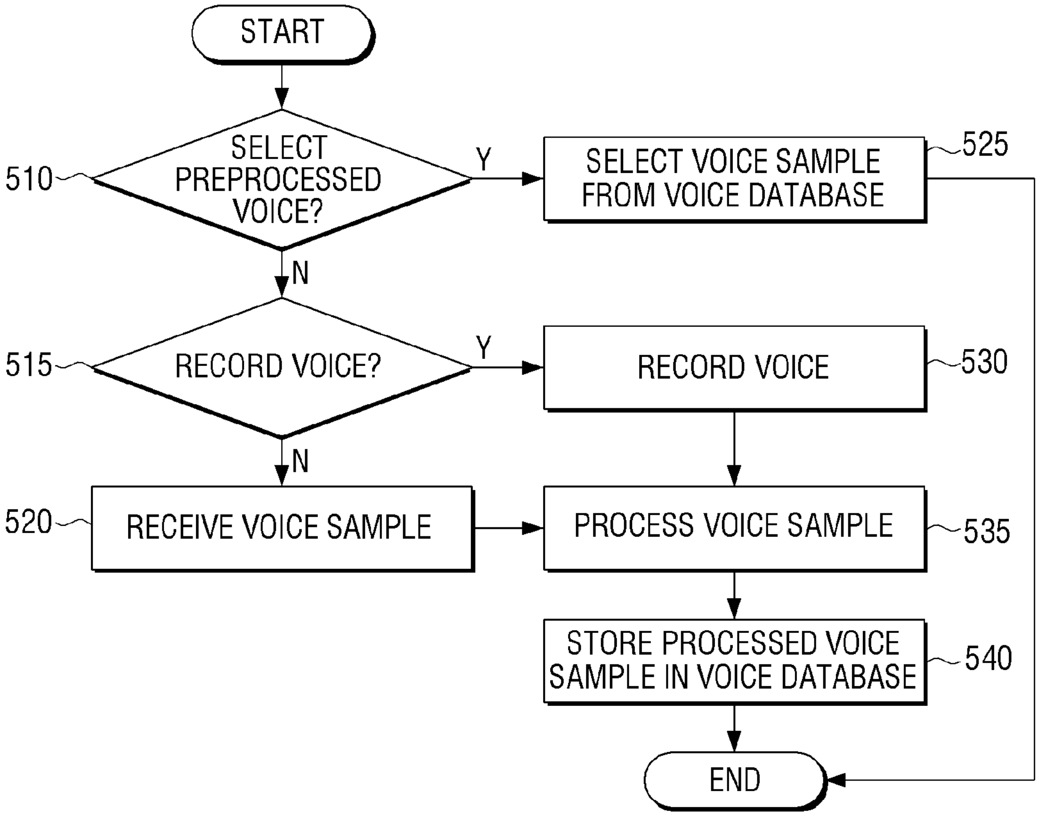
FIG. 6 is a flowchart illustrating a method of selecting a voice sample for customizing a voice, according to an exemplary embodiment.

FIG. 6 is a flowchart illustrating a method of selecting a voice sample for customizing a voice with the use of a voice sub-sampler module, according to an exemplary embodiment. The voice sub-sampler module may process a user-inputted voice sample. For example, the user-inputted voice sample may include, but is not limited to, a recorded voice sample, a sample voice, etc.

Referring to FIG. 6, in operation 510, an option for selecting a voice output from among a plurality of preprocessed voice samples stored in a voice database may be provided to a user. The preprocessed voice samples may be embedded voice samples. The embedded voice samples may be stored in the voice database. The embedded voice samples may be provided by a service provider. To use a preprocessed voice sample for voice customization, in operation 525, a user may select a voice sample from the preprocessed voice samples in the voice database. In a case in which the user does not wish to use a preprocessed voice sample for voice customization, the user may use a recorded voice sample for voice customization.

That is, in operation 515, a determination is made whether the user wishes to use a recorded voice sample by, for example, using a recording module. Then, in operation 530, a recording processing operation may begin. Alternatively, in a case in which the user does not wish to use a recorded voice sample for voice customization, in operation 520, the user may be allowed to enter a voice sample that may be used for voice customization. In operation 535, the recorded voice sample may be processed by a voice sub-sampler module. The voice sub-sampler module may remove various noise, such as random noise, quantization noise, etc., from the recorded voice sample. In operation 540, the voice sub-sampler module may filter the processed voice sample with a smooth filter to improve the quality of the processed voice sample, and may store the processed voice sample in the voice database.

Figure 7A:
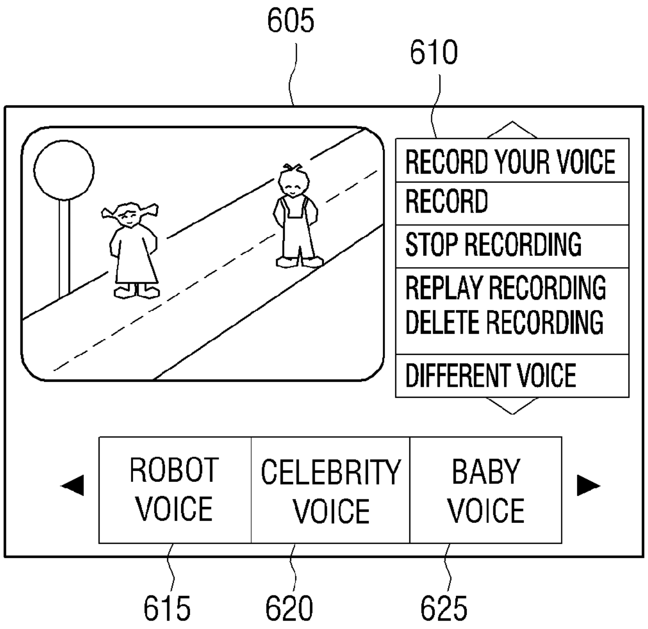
FIGS. 7A and 7B illustrate a UI and a lookup table for selecting a voice sample, according to an exemplary embodiment.
Figure 7B:
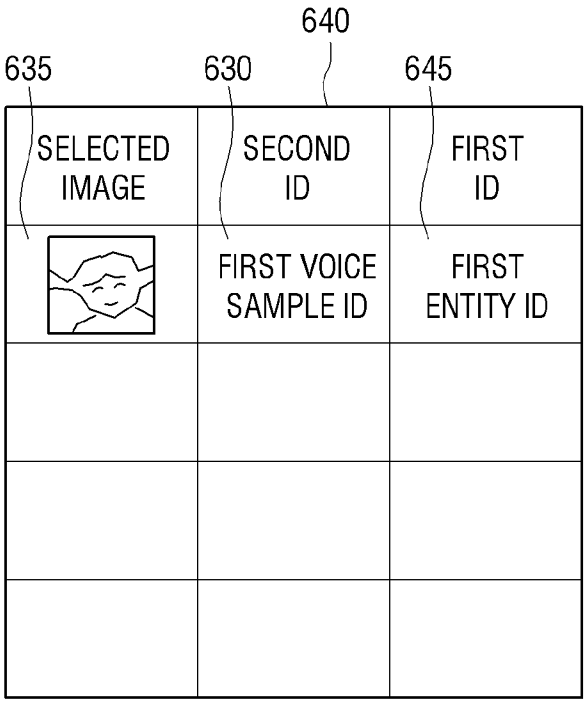

FIG. 7 is a diagram illustrating a UI including a lookup table for selecting a voice sample, according to an exemplary embodiment. More specifically, FIG. 7A illustrates a display unit 605 including a recording module 610, and FIG. 7B illustrates a lookup table 640.

The display unit 605 may display one or more entities included in a video frame. For example, the display unit 605 may be, but is not limited to, a computer, an IPTV, a VOD player, an Internet TV, etc. A user may select an entity from the entities included in the video frame. For example, the user may select an entity from the entities included in the video frame by dragging a cursor or using a keyboard or a touchpad. For example, the selected entity may be a character or a person included in the video frame. The selected entity image may be stored in the lookup table 640, as indicated by reference numeral 635. A first entity ID 645 may be generated in the lookup table 640. The first entity ID 645 may represent the selected entity 635. For example, in a case in which a plurality of entities are selected from the video frame, a plurality of first IDs respectively corresponding to the plurality of entities may be stored in the lookup table 640.

The user may wish to record a voice sample by using the recording module 610. Alternatively or additionally, a "Robot Voice" sample 615, a "Celebrity Voice" sample 620, and a "Baby Voice" sample 625, displayed on a screen, may be used to customize the voice of the selected entity 635. The "Robot Voice" sample 615, the "Celebrity Voice" sample 620, and the "Baby Voice" sample 625 may be stored in a voice database 190 in advance. Each voice sample stored in the voice database may be identified by a second ID. A voice sample selected by the user may be stored in the voice database for use in voice customization. In response to the selection of a voice sample for voice customization for an entity, a second ID 630 corresponding to the selected voice sample may be stored in the lookup table 640. The second ID 630 may be used to fetch the selected voice sample, for a corresponding entity, from the voice database. The selected voice sample may be used to customize the voice of the selected entity 635.

Figure 8:
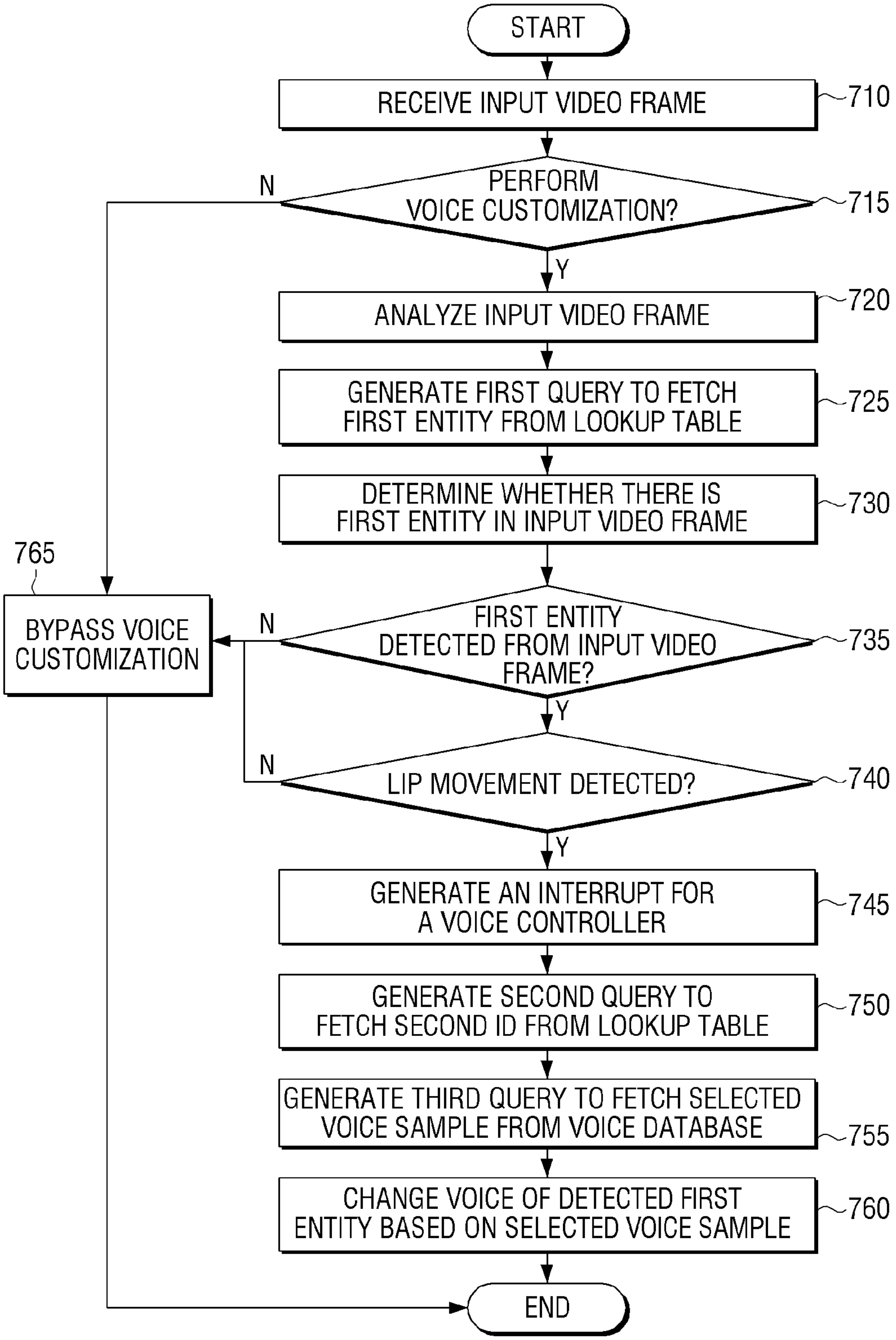
FIG. 8 is a flowchart illustrating a method of customizing a voice, according to an exemplary embodiment.

FIG. 8 is a flowchart illustrating a method of customizing a voice using a processing module, according to an exemplary embodiment. Referring to FIG. 8, in operation 710, a processing module may receive an input video frame. The input video frame may be, but is not limited to, a video clip or a broadcast stream. In operation 715, the processing module may determine whether a user wishes to perform voice customization. If the user does not wish to perform voice customization, in operation 765, the processing module may bypass voice customization.

Alternatively, if the user wishes to perform voice customization, in operation 720, the processing module may analyze the input video frame. More specifically, the processing module may analyze the input video frame by capturing at least one entity from the input video frame. The capture of at least one entity from the input video frame may be performed by a face search sub-module. The processing module may capture at least one entity from the input video frame based on a plurality of entity properties regarding each entity included in the input video frame. For example, the entity properties may include, but are not limited to, skin tone, motion, size, shape, and location. Various algorithms may be used to capture at least one entity from the first video frame.

In operation 725, the processing module may generate a first query to fetch a first entity, which is selected by the user, from a lookup table. The first entity may be provided as an input for the face search sub-module.

In operation 730, the processing module may determine whether there is the first entity in the input video frame. The detection of the first entity from the input video frame may be performed by using the face search sub-module.

In operation 735, if the first entity is detected from the input video frame, in operation 740, the processing module may analyze the input video frame to determine whether there is any lip movement in the detected first entity. Alternatively, in operation 735, if the first entity is not detected from the input video frame, the method proceeds to operation 765.

More specifically, in operation 740, the processing module may detect any lip movement from the detected first entity by using use a lip movement detection sub-module. If a lip movement is detected from the detected first entity, in operation 745, the processing module may generate an interrupt for a voice controller. Alternatively, if no lip movement is detected from the detected first entity, the method proceeds to operation 765.

More specifically, in operation 745, the lip movement detection sub-module may generate an interrupt to be transmitted to the voice controller. The interrupt may be generated as a signal for performing voice customization on the detected first entity. The lip movement detection sub-module may generate the interrupt and transmit the interrupt to the voice controller based on the presence of a lip movement in the detected first entity.

In operation 750, the voice controller may generate a second query to fetch a second ID from the lookup table. The second ID may represent a voice sample selected by the user for a corresponding entity. The selected voice sample may be used to customize the voice of the detected first entity. That is, the second query may be used to fetch the second ID representing the selected voice sample from the lookup table.

In operation 755, a third query may be generated to fetch the selected voice sample from a voice database. The voice database may store a plurality of voice samples for use in voice customization, and each of the plurality of voice samples may be associated with a respective second ID. That is, the third query may be used to fetch the selected voice sample from the voice database.

In operation 760, the voice of the detected first entity may be replaced with the selected voice sample. More specifically, the voice controller may replace the voice of the detected first entity with the selected voice sample. For example, the voice controller may change the properties of the voice of the detected first entity, such as voice tone or pitch, based on the selected voice sample.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A voice conversion method of a display apparatus, the voice conversion method comprising:

in response to receipt of a first video frame, detecting, by the display apparatus, one or more entities from the first video frame;

in response to a selection of one of the detected entities, storing, by the display apparatus, a selected entity;

in response to a selection of one of a plurality of previously stored voice samples, storing, by the display apparatus, a selected voice sample in association with the selected entity in a storage unit; and in response to receipt of a second video frame including the selected entity, changing, by the display apparatus, a voice of the selected entity based on the selected voice sample and outputting the changed voice, wherein the detected entities comprise faces of characters included in the first video frame.

2. The voice conversion method of claim 1, wherein the detecting comprises detecting the faces of the characters from the first video frame based on at least one of an entity skin tone, an entity motion, an entity size, an entity shape, and an entity location.

3. The voice conversion method of claim 1, further comprising:

in response to the detecting the one or more entities from the first video frame, displaying the detected entities in a list, on one side of a display screen.

4. The voice conversion method of claim 1, further comprising:

in response to the selection of the one of the detected entities, displaying the previously stored voice samples in a list, on one side of a display screen.

5. The voice conversion method of claim 1, wherein the storing the selected entity comprises storing a first identifier (ID) corresponding to the selected entity in a lookup table, and the storing the selected voice sample comprises storing a second ID corresponding to the selected voice sample in the lookup table.

6. The voice conversion method of claim 1, wherein the previously stored voice samples comprise at least one of voice samples embedded in advance in the display apparatus, recorded voice samples, and user-inputted voice samples, and wherein at least one of the recorded voice samples and the user-inputted voice samples are filtered.

7. The voice conversion method of claim 1, further comprising:

determining, by the display apparatus, whether the second video frame includes the selected entity.

8. The voice conversion method of claim 1, further comprising:

determining, by the display apparatus, whether there is a lip movement in the selected entity in the second video frame; and in response to detecting the lip movement in the selected entity in the second video frame, replacing, by the display apparatus, the voice of the selected entity with the selected voice sample.

9. A display apparatus comprising:

a detection unit which, in response to receipt of a first video frame, detects one or more entities from the first video frame;

a user interface (UI) unit which receives a first selection regarding an entity to be a subject to voice conversion and a second selection regarding a voice sample to be applied to a selected entity;

a storage which stores an entity, which is selected from the detected entities via the UI unit, and a voice sample, which is selected via the UI unit; and a control unit which, in response to receipt of a second video frame including the selected entity, changes a voice of the selected entity based on the selected voice sample and outputs the changed voice, wherein the detected entities comprise faces of characters included in the first video frame, and wherein at least one of the detection unit, the UI unit, and the control unit is implemented as a hardware processor.

10. The display apparatus of claim 9, wherein the detection unit detects the faces of the characters from the first video frame based on at least one of an entity skin tone, an entity motion, an entity size, an entity shape, and an entity location.

11. The display apparatus of claim 10, wherein the control unit determines whether the second video frame includes the selected entity by using a face search sub-module.

12. The display apparatus of claim 10, wherein the control unit determines whether there is a lip movement in the selected entity in the second video frame and, in response to detecting the lip movement in the selected entity in the second video frame, replaces the voice of the selected entity with the selected voice sample.

13. The display apparatus of claim 9, further comprising:

a video processing unit which processes a video frame;

an audio processing unit which processes an audio signal corresponding to the video frame;

a display unit which displays the video frame processed by the video processing unit; and an audio output unit which outputs the audio signal processed by the audio processing unit in synchronization with the video frame processed by the video processing unit, wherein the control unit controls the audio processing unit to change the voice of the selected entity based on the selected voice sample and provide the changed voice to the audio output unit.

14. The display apparatus of claim 13, wherein the control unit controls the display unit to display the detected entities in a list, on one side of a display screen, in response to detecting the one or more entities from the first video frame.

15. The display apparatus of claim 13, wherein the control unit controls the display unit to display a plurality of voice samples in a list, on one side of a display screen, in response to selecting the one of the detected entities.

16. The display apparatus of claim 9, wherein the storage stores a first identifier (ID) corresponding to the selected entity and a second ID corresponding to the selected voice sample in a lookup table.

17. The display apparatus of claim 9, wherein the storage unit stores at least one of voice samples embedded in advance in the display apparatus, recorded voice samples, and user-inputted voice samples.

18. The display apparatus of claim 17, wherein at least one of the recorded voice samples and the user-inputted voice samples are filtered by a voice sub-sampler module.

19. A method comprising:

receiving, by a display apparatus, a selection of a face of a character from a first piece of content;

receiving, by the display apparatus, a selection of a replacement voice for the selected face of the character;

associating, by the display apparatus, the selected face of the character with the replacement voice;

subsequently, receiving, by the display apparatus, a second piece of content;

identifying, by the display apparatus, the selected face of the character in the second piece of content;

detecting, by the display apparatus, sounds uttered by the selected face of the character, in the second piece of content;

altering, by the display apparatus, detected uttered sounds with characteristics of the replacement voice; and outputting, by the display apparatus, the second piece of content, in which the sounds uttered by the selected face of the character are altered with the characteristics of the replacement voice.

20. The method of claim 19, wherein the associating comprises:

storing, by the display apparatus, the selected face of the character and the replacement voice in a database;

generating, by the display apparatus, a first identifier (ID) corresponding to the selected face of character;

generating, by the display apparatus, a second ID corresponding to the replacement voice;

storing, by the display apparatus, the first ID in association with the second ID in a lookup table;

detecting, by the display apparatus, the selected face of the character in the second piece of content; and fetching, by the display apparatus, the replacement voice from the database, based on the first ID and the second ID located in the lookup table.

* * * * *